July 23, 1940.   C. B. DOTY   2,208,722
TRIM PANEL FASTENER
Original Filed Feb. 15, 1936
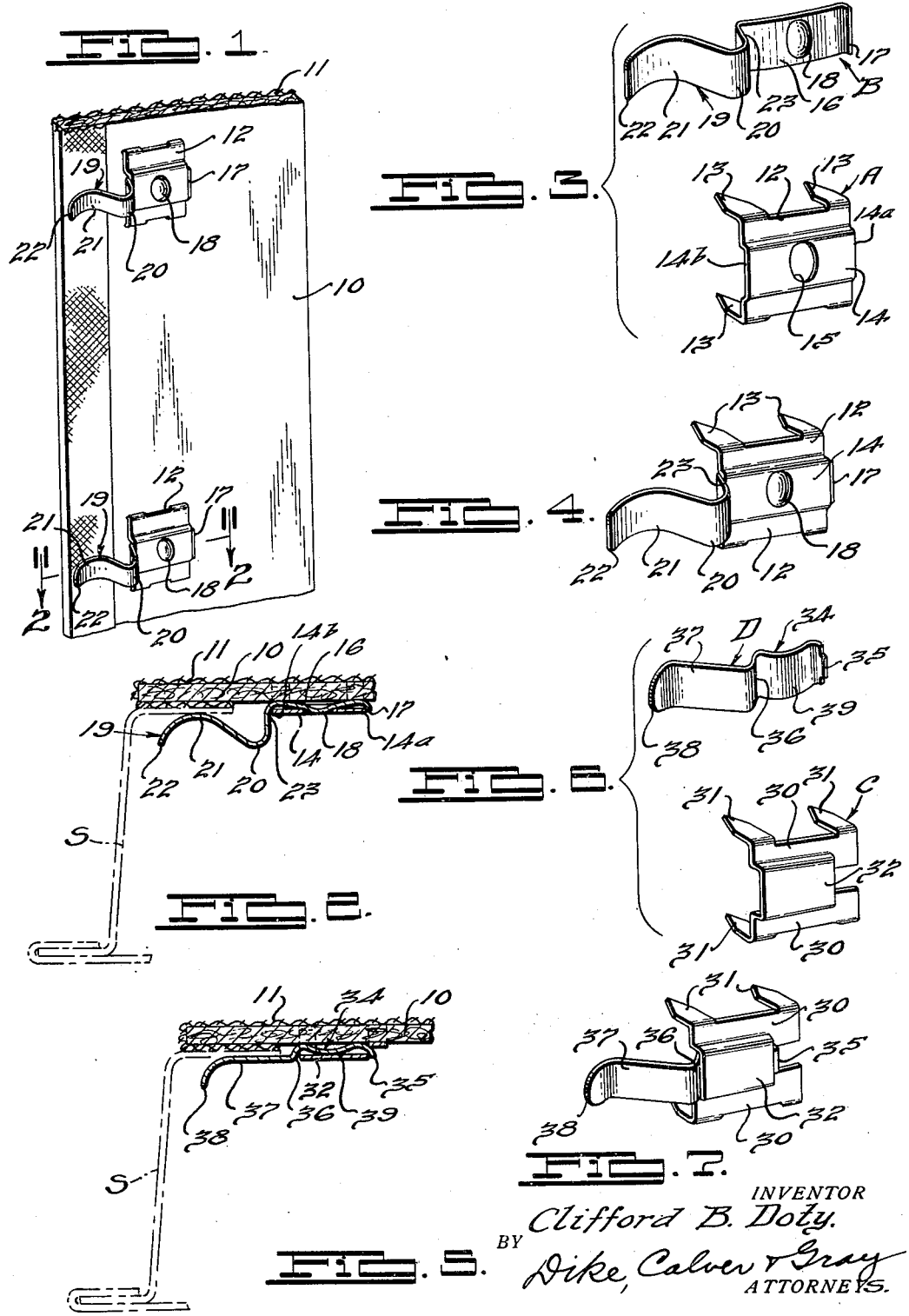
INVENTOR
Clifford B. Doty.
BY Dike, Calver & Gray
ATTORNEYS.

Patented July 23, 1940

2,208,722

UNITED STATES PATENT OFFICE 2,208,722

TRIM PANEL FASTENER

Clifford B. Doty, Detroit, Mich., assignor to Briggs Manufacturing Company, Detroit, Mich., a corporation of Michigan Continuation of application February 15, 1936, Serial No. 64,001. Divided and this application November 18, 1937, Serial No. 175,311

7 Claims. (Cl. 24—259)

This invention relates to trim panels or trim panel assemblies adapted for use in the interior trim finish of automobiles or other vehicle bodies, and especially to fastener devices including retainer members for trim panels. The present application is a continuation of my co-pending application Serial No. 64,001, filed February 15, 1936.

In conventional practice the interior body trim, including portions of the trimming for the doors, comprises panels usually composed of non-metallic backing sheet covered with the trim fabric, these panels being usually attached to the doors or other framing supports of the body by means of separate concealed snap fasteners. These fasteners are usually in the form of bent wire devices which must be anchored by hand in apertures in retainer plates or sockets located at the back of the trim panel and which, when the panel is mounted on the body, fasten into apertures in the latter. This mode of constructing and attaching the trim panels to the body framing has many disadvantages. Because of the large numbers of these fastener devices required for each body and the time, labor and expense necessary for their manufacture and installation, the use thereof in practice amounts to a substantial item of expense in the manufacture of automobile bodies.

An important object of the present invention is to eliminate these disadvantages, simplify and improve the fastening means for the panels and reduce the cost thereof, thereby effecting substantial manufacturing economies while at the same time providing a more satisfactory, simple and efficient construction.

Another object of the invention is to provide improved fastener means for a trim panel for removably attaching the panel to a supporting surface with ease and facility.

A further object of the invention is to provide an improved fastener device in which the device includes, and is detachably associated with, the retainer for attaching it to the trim panel.

Other objects and advantages of the invention will appear from the following description and appended claims when taken in connection with the accompanying drawing forming a part of this specification, wherein like reference characters designate corresponding parts in the several views.

In said drawing:

Fig. 1 is a fragmentary perspective view of a trim panel having applied thereto one form of fastener device embodying the present invention.

Fig. 2 is an enlarged fragmentary section taken substantially along the line 2—2 of Fig. 1 and showing the panel attached to a supporting surface.

Fig. 3 is an enlarged perspective view of a preferred form of fastener device similar to that of Fig. 1, and showing the parts separated.

Fig. 4 is an enlarged perspective view showing the parts of the device of Fig. 3 in assembled relation.

Fig. 5 is a view similar to Fig. 2 showing a somewhat modified form of fastener device embodying the invention.

Fig. 6 is an enlarged perspective view of the fastener device of Fig. 5, showing the parts prior to assembly; and Fig. 7 is an enlarged perspective view of the fastener device of Figs. 5 and 6 and showing the parts in assembled relation.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring particularily to Figs. 1 to 4 of the drawing, the trim panel therein illustrated comprises a base or foundation sheet 10 having on one face the usual trim fabric covering 11. The fastener device of this form of the invention is adapted to be secured to the inner face of the foundation sheet 10. As shown, the device includes a retainer member shown as a whole at A for attaching the fastener element B to the foundation sheet. The retainer A is preferably in the form of a staple-like member formed of light weight sheet metal stamped out of a single piece of material, having a body portion 12 provided with spaced penetrating prongs 13. The body portion is provided with an upstanding or offset embossed portion providing a channel or socket 14, the channel having formed therein an opening or aperture 15.

The fastener element B of the present form of the invention has a body or base portion 16 having at its rear end an upturned flange or flared portion 17 and a substantially centrally disposed upwardly projecting portion or embossment 18. The opposite end of the base portion 16 is extended to provide a spring gripping portion shown as a whole at 19 and comprises an inverted substantially U-shaped spring bow 20, a gripping portion 21 and a free end or lead portion 22. The base portion 16, as best seen in Fig. 2, is substantially sinuous in shape.

The fastener device comprising the parts A and B is preferably attached to the foundation sheet 10 by causing the prongs 13 of the retainer member to penetrate the material of the sheet after which the lead ends or points of the prongs are clinched over to engage or become embedded in the opposite face of the foundation sheet. When thus applied, the base portion 12 of the retainer lies substantially flat upon the adjacent face of the panel and the channel or socekt portion 14 thereof is spaced from said panel face. The fastener element B may now be snapped into place with relation to the retainer by inserting the base portion 16 in the channel and sliding or forcing the fastener element into place, whereupon the embossment or raised portion 18 will enter the opening or sockt 15 to secure the parts together. The flared end or abutment 17 and the upright portion or abutment 23 of the fastener element will engage the opposite end edges 14a and 14b of the channel 14 and thus cooperate with the embossment 18 and opening 15 to hold the parts together against accidental displacement. It is possible to remove the fastener element B from its position with relation to the retainer A by pressing on the portion 20 of the fastener element in an outward direction. The material of the element B being preferably spring steel, will allow its base portion 16 to flex sufficiently to permit its removal from the retainer A.

In Figs. 5, 6 and 7, there is shown a somewhat modified form of fastener device embodying the present invention. In this form the fastener device comprises a retainer member shown as a whole at C and a fastener element shown as a whole at D. The retainer has a body portion 30 provided with a plurality of prongs 31 and with an upstanding socket or channel 32. As shown, the channel is somewhat shorter in length than the base portion 30. The retainer C is applied to the foundation sheet 10 by causing the prongs 31 to penetrate the sheet, after which their ends are clinched over and preferably embedded in the material of the sheet at the opposite face thereof.

The fastener element D of the present invention has a base or body portion shown as a whole at 34 provided at its inner end with an anchoring lug or abutment 35. At an intermediate point the fastener member or element D is pressed to provide an outwardly extending abutment 36. Thence the element or member is formed with a working or spring gripping portion 37 which is inclined substantially to the face of the backing sheet, the portion 37 being arcuate and flared outwardly to provide a guide or lead portion 38. The portion 39 of the fastener element base 34 intermediate the abutments 35 and 36 is preferably corrugated or crowned to provide resilient or yieldable portions. The fastener element is preferably formed of spring steel and shaped, as shown, in any suitable manner, as by stamping.

The fastener element D is secured to the inner or concealed face of the backing sheet 10 by the retainer or staple-like member C which has previously been applied to the backing sheet. The fastener element D is forced endwise through the channel or socket portion 32, the parts 35 and 39, as well as the surface of the fiberboard 10 yielding sufficiently to permit passage of the sinuous base portion 34 of the fastener until it snaps into place as shown in Fig. 5. As seen in this figure, the abutments 35 and 36 engage the opposite end edges of the channel portion 32 and prevent the fastener element from becoming dislodged, the crowned portion 39 thereof being held somewhat under compresison within the channel 32 so as to frictionally hold the fastener element relatively tightly in place.

It will be understood that in both forms of the invention the retainers are first applied to the backing sheet. They may be shipped or transported to destination in this condition. When it becomes desirable to apply a trim panel to a supporting surface, such as a flange of the support S, see Figs. 2 and 5, the fastener elements are forced endwise through the channel portions of the retainers and snapped into place in said channel portions. When the panel is applied, the spring gripping portions 21 or 37 of the fastener devices engage behind the flange of the support.

I claim:

1. A fastener device for a trim panel having a foundation sheet, comprising a retainer having a body portion provided with an offset channel extending longitudinally thereof and spaced prongs adapted to penetrate the foundation sheet to hold the retainer to said sheet, a fastener element having a sinuous base portion and an integral spring gripping portion, said base being insertable in said retainer channel and said spring gripping portion being located outside said channel, and cooperating means on said base and said channel to releasably lock the parts together, said base means comprising spaced lugs adapted to grip the end edges of the channel.

2. A fastener device for a trim panel having a foundation sheet, comprising a retainer having a body portion provided with an offset channel extending longitudinally thereof and spaced prongs adapted to penetrate the foundation sheet to hold the retainer to said sheet, a fastener element formed from a flat strip of metal having a base located within the channel, said base having a curvature lengthwise thereof and an integral spring gripping portion extending from one side of the base and in the general direction thereof, and cooperating means on said base and said channel for releasably locking the fastener element and retainer together.

3. A fastener device formed from a single piece of sheet metal comprising an oblong base portion having a raised embossment of substantially dome shape formed from the metal of the base and adapted for an engagement with a retainer, one end of the base terminating in a spring bow having a flared gripping member extending outwardly therefrom.

4. A fastener device for a trim panel having a foundation sheet, comprising a retainer having a body portion provided with an offset channel narrower than the body portion extending longitudinally thereof and means for securing the retainer to the sheet, and a fastener element having a base portion insertable within the channel and a spring gripping portion projecting beyond one end of the channel, said channel having a socket formed in its top wall and said base portion having a projection fitting within the socket to maintain the parts in assembled relation.

5. A fastener device for a trim panel having a foundation sheet, comprising a retainer having a body portion provided with an offset channel narrower than the body portion extending longitudinally thereof and means for securing the retainer to the sheet, and a fastener element having a base portion located within the channel and a spring gripping portion projecting beyond one end of the channel, said channel having a circular opening formed therein and said base having a circular embossment extending into the opening to maintain the fastener element and retainer together.

6. A fastener device for a trim panel having a foundation sheet, comprising a retainer having a body portion provided with an offset channel extending longitudinally thereof and spaced prongs adapted to penetrate the foundation sheet to hold the retainer to said sheet, and a fastener element having a sinuous base portion provided with abutments at opposite ends thereof and a spring gripping portion extending outwardly beyond one of the abutments, said base portion being insertable in the retainer channel whereby the abutments engage opposite ends of the channel to releasably lock the parts together.

7. A fastener device for a trim panel having a foundation sheet, comprising a retainer having a body portion provided with an offset channel extending longitudinally thereof and means for securing the retainer to said sheet, and a fastener element having a base portion provided with abutments at opposite ends thereof and a spring gripping portion extending outwardly beyond one of the abutments, said channel having an opening formed in a wall thereof and said base portion having an embossment adapted to seat within the opening when said base portion is inserted in the channel, and said abutments engageable with opposite end edges of said channel to releasably maintain the parts together as a unit.

CLIFFORD B. DOTY.